United States Patent
Shi et al.

(10) Patent No.: US 9,137,695 B2
(45) Date of Patent: Sep. 15, 2015

(54) APPARATUS AND METHODS FOR CONTINUOUS INTER-FREQUENCY MEASUREMENT RECONFIGURATIONS OF DC-HSUPA UE

(71) Applicant: QUALCOMM Incorporated, San Diego, CA (US)

(72) Inventors: Yongsheng Shi, San Diego, CA (US); Aditya Gautam, Hyderabad (IN); Nilotpal Dhar, Hyderabad (IN); Liangchi Hsu, San Diego, CA (US); Arvindhan Kumar, San Diego, CA (US); Chetan Gopalakrishnan Chakravarthy, San Diego, CA (US); Luna Sapna D'Souza, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 14/166,628

(22) Filed: Jan. 28, 2014

(65) Prior Publication Data

US 2015/0036518 A1 Feb. 5, 2015

Related U.S. Application Data

(60) Provisional application No. 61/862,219, filed on Aug. 5, 2013.

(51) Int. Cl.
  *H04W 24/08* (2009.01)
  *H04W 24/10* (2009.01)
  *H04W 36/00* (2009.01)

(52) U.S. Cl.
  CPC .............. *H04W 24/08* (2013.01); *H04W 24/10* (2013.01); *H04W 36/0088* (2013.01)

(58) Field of Classification Search
  CPC . H04W 24/08; H04W 24/10; H04W 36/0088; H04W 48/16
  USPC ................................ 370/252–329; 455/67.11
  See application file for complete search history.

(56) References Cited

U.S. PATENT DOCUMENTS

| 8,477,657 | B2* | 7/2013 | Wang et al. .................... 370/254 |
| 8,639,239 | B2* | 1/2014 | Uemura et al. ............... 455/423 |
| 2010/0322079 | A1* | 12/2010 | Kitazoe et al. ................ 370/241 |
| 2012/0113866 | A1* | 5/2012 | Tenny et al. ................... 370/254 |
| 2015/0017924 | A1* | 1/2015 | Worrall et al. ............. 455/67.11 |
| 2015/0029917 | A1* | 1/2015 | Kim ............................. 370/311 |
| 2015/0050939 | A1* | 2/2015 | Futaki et al. ............... 455/452.1 |

OTHER PUBLICATIONS

3GPP TSG-RAN2 Meeting #184 (R2-133775) San Francisco, U.S., Nov. 11-Nov. 15, 2013, 23 pages.

* cited by examiner

*Primary Examiner* — Afsar M Qureshi
(74) *Attorney, Agent, or Firm* — Arent Fox LLP

(57) ABSTRACT

Disclosed are systems and methods for continuous inter-frequency measurement reconfigurations in a DC-HSUPA User Equipment (UE). In one aspect, the system may configure the UE to perform intra-frequency measurements on a frequency f1 and inter-frequency measurements on a frequency f2 in a dual carrier (DC) downlink (DL) mode and a single carrier (SC) uplink (UL) mode. The system may then reconfigure the UE to operate in a DC UL mode and continuing to perform inter-frequency measurements on the frequency f2 in the DC UL mode. The system may then reconfigure the UE to operate in the SC UL mode and continuing to perform inter-frequency measurements on frequency f2 in the SC UL mode.

19 Claims, 7 Drawing Sheets

APPARATUS AND METHODS FOR CONTINUOUS INTER-FREQUENCY MEASUREMENT RECONFIGURATIONS OF DC-HSUPA UE

CLAIM OF PRIORITY UNDER 35 U.S.C. §119

The present Application for Patent claims priority to Provisional Application No. 61/862,219, filed Aug. 5, 2013, and assigned to the assignee hereof and hereby expressly incorporated by reference herein.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. High Speed Uplink Packet Access (HSUPA) is a data service offered on the downlink of WCDMA networks.

In a legacy 3GPP UMTS Release 8 HSUPA specification (Rel-8), where the UE is configured to operate in dual carrier (DC) downlink (DL) mode and single carrier (SC) uplink (UL) mode, assuming the primary frequency is f1 and the secondary frequency is f2, the network can configure the UE to perform intra-frequency measurement on frequency f1 and inter-frequency measurement on frequency f2. While performing intra-frequency measurement on f1, the UE may need an intra-frequency neighbor cell list (NCL) and the Active Set (ASET) to do cell measurement and report. While performing inter-frequency measurement on f2, the UE may need an inter-frequency NCL and the Virtual Active Set (VASET) to do cell measurement and report. Notably, there is no real ASET for the "inter-frequency", i.e. f2, measurements because f2 is considered as non-used frequency. In short in Rel-8, UE has inter-frequency NCL on f2 and VASET on f2 to perform inter-frequency measurement on f2.

In a 3GPP UMTS Release 9 HSUPA specification (Rel-9), with the introduction of DC HSUPA, there are two carriers (frequencies f1 and f2) in both DL and UL and both frequencies are considered as used frequencies. The network can configure the UE to perform intra-frequency measurement on f2. So the UE will maintain two ASETs: one is on the primary frequency, f1, a.k.a. ASET, and the other is on the secondary frequency, f2, a.k.a. the secondary ASET. Also, the network will configure the UE with both intra-frequency NCL on f1 and intra-frequency NCL on f2. UE needs to use intra-frequency NCL on f2 and the secondary ASET to perform intra-frequency measurement and report on f2. In short, in Rel-9, UE has intra-frequency NCL on f2 and the secondary ASET on f2 to perform intra-frequency measurement on f2. As a legacy behavior, the UE may also continue to perform inter-frequency measurement on f2.

However, the HSUPA specifications do not specify how to perform inter-frequency measurement on f2 when the UE is reconfigured from SC UL to DC UL and from DC UL back to SC UL. Therefore, there is a need for technique for performing these UE reconfigurations in compliance with Rel-8 and Rel-9 HSUPA specifications.

SUMMARY

The following presents a simplified summary of one or more aspects of systems, methods and computer program products for continuous inter-frequency measurement reconfigurations of DC-HSUPA user equipment.

In one aspect, an example method for continuous inter-frequency measurement reconfigurations in a UE includes configuring the UE to perform intra-frequency measurements on a frequency f1 and inter-frequency measurements on a frequency f2 in a dual carrier (DC) downlink (DL) mode and a single carrier (SC) uplink (UL) mode, reconfiguring the UE to operate in a DC UL mode and continuing to perform inter-frequency measurements on the frequency f2 in the DC UL mode, and reconfiguring the UE to operate in the SC UL mode and continuing to perform inter-frequency measurements on frequency f2 in the SC UL mode.

In one aspect, the configuring of the UE further includes configuring an inter-frequency neighbor cell list (NCL) and a virtual Active Set (VASET) for performing inter-frequency measurements on the frequency f2.

In another aspect, the reconfiguring of the UE to operate in a DC UL mode further includes configuring a secondary ASET for intra-frequency measurements on the frequency f2 and continuing to perform the inter-frequency measurement on the frequency f2 using the inter-frequency NCL and the secondary ASET.

In another aspect, the reconfiguring of the UE to operate in a DC UL mode further includes configuring an intra-frequency NCL for intra-frequency measurements on the frequency f2, merging the intra-frequency NCL with the inter-frequency NC; and continuing to perform the inter-frequency measurements on the frequency f2 using a merged NCL and the secondary ASET.

In another aspect, the merging of the intra-frequency NCL with the inter-frequency NCL further includes, if the merged NCL contains more than 32 cells, removing one or more excess cells from the inter-frequency NCL and merging it with the intra-frequency NCL.

In another aspect, the removing of one or more excess cells from the inter-frequency NCL further includes removing one or more excess cells having poorest signal quality.

In another aspect, the reconfiguring of the UE to operate in a DC UL mode further includes maintaining separately the inter-frequency NCL and the intra-frequency NCL, and continuing to perform the inter-frequency measurements on the frequency f2 using the inter-frequency NCL and the secondary ASET.

In another aspect, the reconfiguring of the UE to operate in a DC UL mode further includes maintaining a single intra-frequency NCL, and continuing to perform the inter-frequency measurements on the frequency f2 using the intra-frequency NCL and the secondary ASET.

In another aspect, the reconfiguring of the UE to operate in the SC UL mode further includes configuring a new VASET for inter-frequency measurements on the frequency f2 in the SC UL mode and continuing to perform inter-frequency measurement on frequency f2 using the inter-frequency NCL and the new VASET in the SC UL mode.

In another aspect, the configuring of a new VASET further includes automatically configuring by the UE a new VASET without measurement control message (MSM) from a network in the SC UL mode.

In another aspect, the configuring of a new VASET further includes copying a secondary ASET into the new VASET for inter-frequency measurements on the frequency f2 in the SC UL mode.

In another aspect, the method further includes merging the intra-frequency NCL with the inter-frequency NCL into a new inter-frequency NCL for inter-frequency measurements on the frequency f2 in the SC UL mode.

In another aspect, the method further includes maintaining separately the inter-frequency NCL and the intra-frequency NCL and continuing to perform the inter-frequency measurements on the frequency f2 using the inter-frequency NCL in the SC UL mode.

In another aspect, the reconfiguring of the UE to operate in a DC UL mode further includes copying the intra-frequency NCL into a new inter-frequency NCL for inter-frequency measurements on the frequency f2 in the SC UL mode.

In another aspect, an example apparatus for continuous inter-frequency measurement reconfigurations in a UE comprises a dual carrier (DC) downlink (DL) mode configurer for configuring the UE to perform intra-frequency measurements on a frequency f1 and inter-frequency measurements on a frequency f2 in a DC DL mode, a single carrier (SC) uplink (UL) mode configurer for configuring the UE to perform inter-frequency measurements on the frequency f2 in a SC UL mode, a DC UL mode configure for reconfiguring the UE to operate in a DC UL mode and continue to perform inter-frequency measurements on the frequency f2 in the DC UL mode, wherein the SC UL mode configurer further operable to reconfigure the UE to operate in the SC UL mode following the DC UL mode and continue to perform inter-frequency measurements on frequency f2 in the SC UL mode.

In another aspect, an example apparatus for continuous inter-frequency measurement reconfigurations in a UE comprises at least one processor configured to: configure the UE to perform intra-frequency measurements on a frequency f1 and inter-frequency measurements on a frequency f2 in a dual carrier (DC) downlink (DL) mode and a single carrier (SC) uplink (UL) mode, reconfigure the UE to operate in a DC UL mode and continuing to perform inter-frequency measurements on the frequency f2 in the DC UL mode, and reconfigure the UE to operate in the SC UL mode and continuing to perform inter-frequency measurements on frequency f2 in the SC UL mode.

In another aspect, an example apparatus for continuous inter-frequency measurement reconfigurations in a UE comprises means for configuring the UE to perform intra-frequency measurements on a frequency f1 and inter-frequency measurements on a frequency f2 in a dual carrier (DC) downlink (DL) mode and a single carrier (SC) uplink (UL) mode, means for reconfiguring the UE to operate in a DC UL mode and continuing to perform inter-frequency measurements on the frequency f2 in the DC UL mode, and means for reconfiguring the UE to operate in the SC UL mode and continuing to perform inter-frequency measurements on frequency f2 in the SC UL mode.

In another aspect, an example computer program product for continuous inter-frequency measurement reconfigurations in a UE includes a non-transitory computer-readable medium comprising: code for configuring the UE to perform intra-frequency measurements on a frequency f1 and inter-frequency measurements on a frequency f2 in a dual carrier (DC) downlink (DL) mode and a single carrier (SC) uplink (UL) mode, code for reconfiguring the UE to operate in a DC UL mode and continuing to perform inter-frequency measurements on the frequency f2 in the DC UL mode, and code for reconfiguring the UE to operate in the SC UL mode and continuing to perform inter-frequency measurements on frequency f2 in the SC UL mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
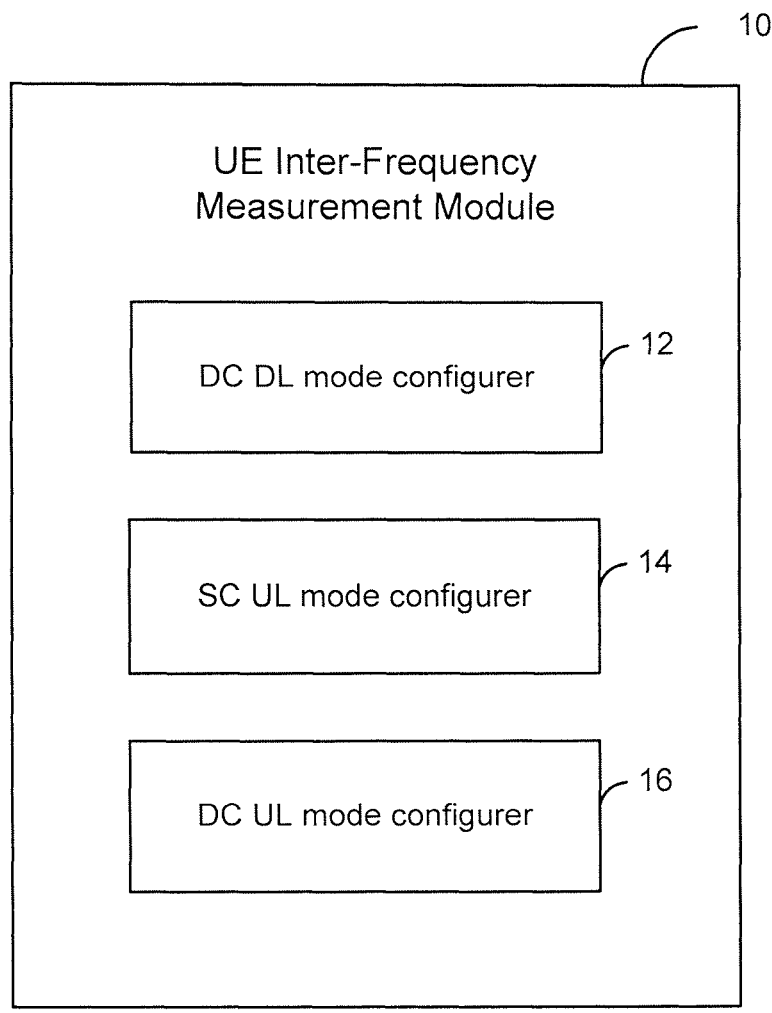
FIG. 1 is a block diagram of an example implementation of a system for continuous inter-frequency measurement reconfigurations of UE according to one aspect.

FIG. 1 illustrates one example implementation a system for continuous inter-frequency measurements that supports both Rel-8 and Rel-9 HSUPA specifications according to one aspect. The system includes a UE inter-frequency measurement module 10 that may be implemented in a UMTS UE. In one aspect, the module 10 includes a DC DL mode configurer 12 for configuring the UE to operate in the DC DL mode in which the UE performs intra-frequency measurements on a frequency f1 and inter-frequency measurements on a frequency f2. The UE inter-frequency measurement module 10 further includes a SC UL mode configurer 14 for configuring and reconfiguring the UE to operate in a SC UL mode in which the UE continues to perform inter-frequency measurements on the frequency f2. The UE inter-frequency measurement module 10 further includes a DC UL mode configurer 16 for reconfiguring the UE to operate in a DC UL mode in which the UE may continue to perform inter-frequency measurements on the frequency f2.

Figure 2:
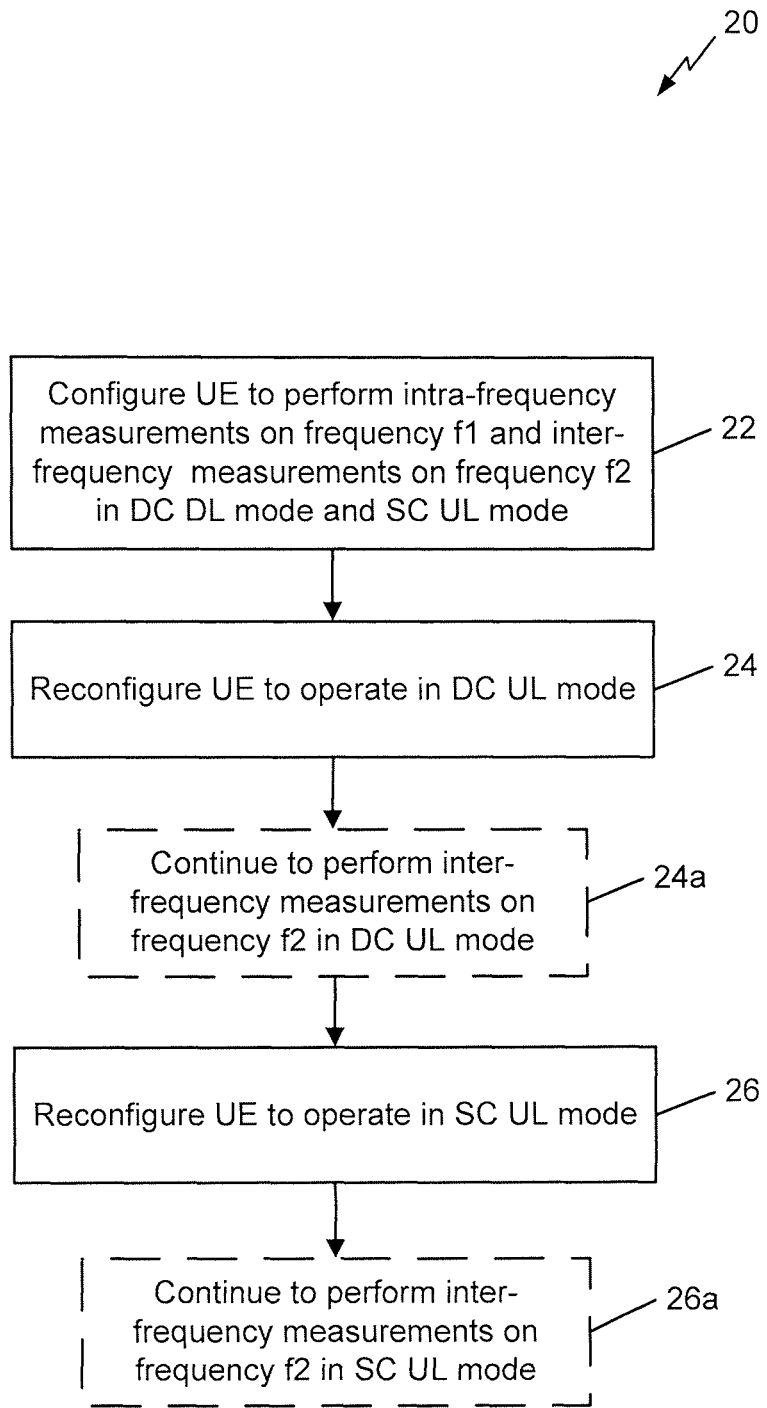
FIG. 2 is a high-level flow chart of example methodology for continuous inter-frequency measurement reconfigurations of UE according to one aspect.

FIG. 2 is an example methodology for continuous inter-frequency measurement reconfigurations of a UE according to one aspect. The method 20 may be implemented by the UE inter-frequency measurement module 10 of FIG. 1. At step 22, the method 20 includes configuring the UE to perform intra-frequency measurements on frequency f1 and inter-frequency measurements on frequency f2 in DC DL mode and SC UL mode. For example, in one aspect, the DC DL mode configurer 12 and the SC UL mode configurer 14 may be used to configure the DC DL and SC UL modes, respectively. At step 24, the method 20 includes reconfiguring UE to operate in a DC UL mode in which, at step 24a, the UE continues to perform inter-frequency measurements on frequency f2. In one aspect, the DC UL mode configurer 16 may be used to reconfigure the UE to operate in the DC UL mode. At step 26, the method 20 includes reconfiguring the UE to operate in SC UL mode again in which the UE continues, at 26a, to perform inter-frequency measurements on frequency f2. In one aspect, the SC UL mode configurer 14 may be used to reconfigure the UE to operate in the SC UL again. While, for purposes of simplicity of explanation, the methodology is shown and described as a series of acts, it is to be understood and appreciated that the methodology is not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram.

Figure 3:
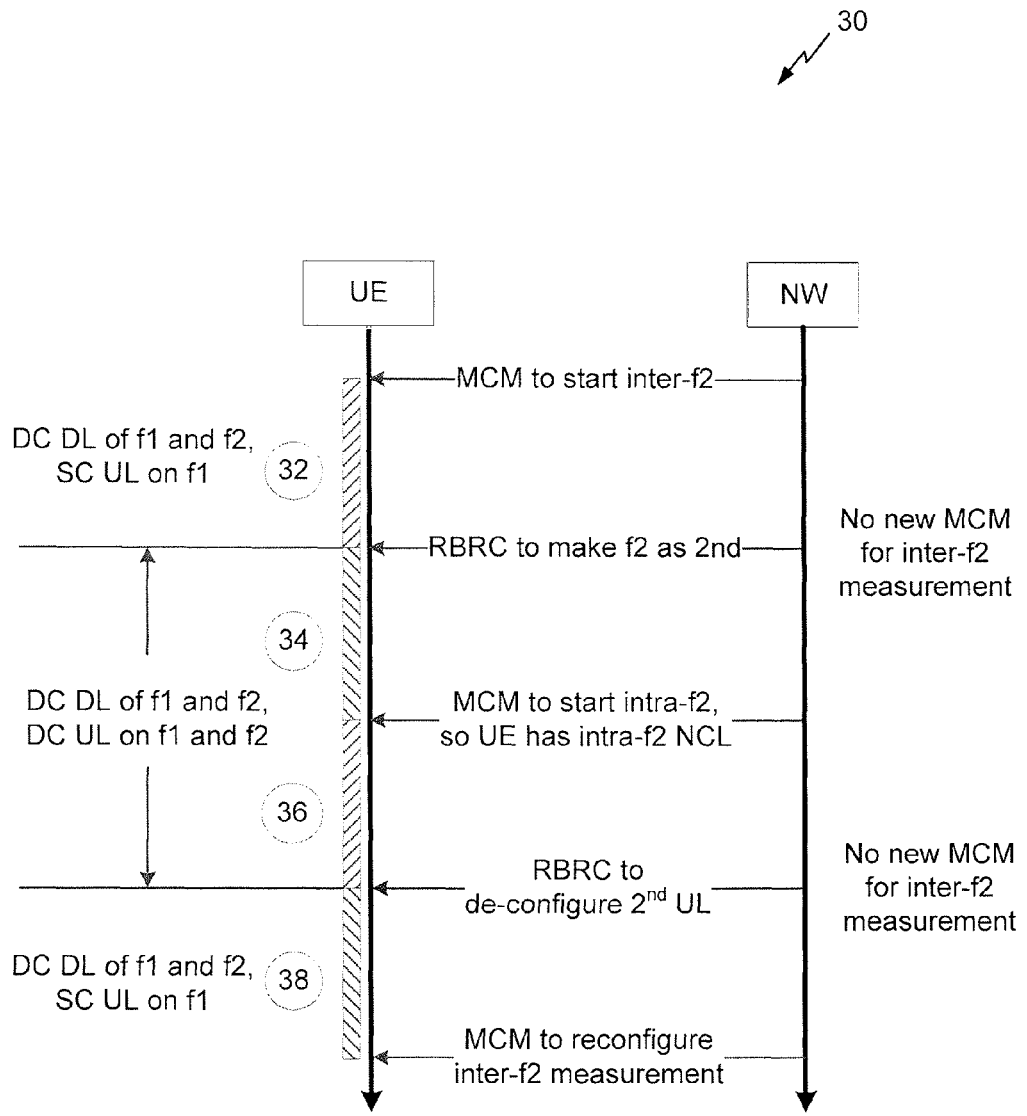
FIG. 3 is a detailed call flow of example methodology for continuous inter-frequency measurement reconfigurations of UE according to one aspect.

FIG. 3 is a more detailed call flow of the methodology for continuous inter-frequency measurement reconfigurations of DC-HSUPA UE. The method 30 may be implemented by the UE inter-frequency measurement module 10 of FIG. 1. Initially, at stage 32, the UE may be configured to operate in DC DL and SC UL modes. The network controller (NW) may use Measurement Control Message (MCM) to configure inter-frequency measurement on frequency f2. During the configuration of the DC DL mode, the UE may build VASET on frequency f2 and also use the configured inter-frequency NCL on frequency f2 to perform measurements and report. Also, in one aspect, the UE may be configured to perform inter-frequency measurement on another frequency, e.g. frequency f3. At the end of stage 32, the NW may decide to reconfigure the UE from SC UL to DC UL mode. For example, the network may send a Radio Bearer Reconfiguration (RBRC) message to the UE to make f2 a second DL frequency associated with the secondary UL frequency. At this time, the UE may configure a secondary ASET on frequency f2 with new cells information received from the NW.

At stage 34, in the DC UL mode, the UE may continue to perform inter-frequency measurement on f2 using the currently stored inter-frequency NCL on frequency f2 and the secondary ASET on frequency f2. The UE may also continue inter-frequency measurement on other frequencies using the currently stored inter-frequency NCL on frequency f3 and VASET of frequency f3 (VASET is used on f3 because there is no UL associated with f3). There are several advantages of this approach: It is desirable to report inter-frequency measurement results to the network. It helps to achieve seamless measurement report. It is simplifies the UE implementation because the UE can continue its previous behavior. It may save signaling load because the network will not need to use another MCM to start the measurement again. At the end of stage 34, the network may send a MCM to configure the UE with intra-frequency measurement on f2 and intra-frequency NCL on f2. Now, the UE has two NCLs for frequency f2: the intra-frequency NCL and the legacy inter-frequency NCL.

At stage 36, the UE may use several different methods for handling multiple NCLs on f2. In one aspect, the UE may follow the network's configuration in MCM. If MCM does not remove the cells in the inter-frequency NCL on f2, the UE may merge inter-frequency NCL and intra-frequency NCL into a single NCL. The UE may use the resulting NCL and the secondary ASET for inter-frequency measurement on f2. In another aspect, if the resulting NCL contains more than 32 cells, the UE may keep all cells in the intra-frequency NCL and remove excess cells from the inter-frequency NCL to bring the total cell count below 32. In another aspect, if the UE needs to remove excess cells, the UE may select the cells having poorest signal quality in the inter-frequency NCL. In yet another aspect, the UE may maintain two separate NCLs: intra-frequency NCL and inter-frequency NCL. The UE may use inter-frequency NCL on f2 and the secondary ASET for inter-frequency measurement and report on f2. In yet another aspect, the UE may maintain one NCL: intra-frequency NCL on f2 received by a MCM. The UE does not merge intra-frequency NCL on f2 and inter-frequency NCL on f2. The UE may use intra-frequency NCL on f2 and the secondary ASET for inter-frequency measurement and report on f2. In another aspect, the UE may only apply the measurement requirement of intra-frequency measurement to perform inter-frequency measurements on f2. This is because f2 is actually used frequency and network already configures intra-frequency measurement on it. At the end of stage 36, the network may reconfigure the UE from DC UL to SC UL using, for example, RBRC message, so that f2 becomes a non-used frequency again.

At stage 38, in the SC UL mode, to perform inter-frequency measurement on f2, the UE again needs a VASET on f2 and inter-frequency NCL on f2. The UE needs to decide whether to continue or stop inter-frequency measurement on f2 and other frequencies. If the UE continues measurement, the UE needs to decide how to generate VASET on f2 and inter-frequency NCL on f2. In one aspect, the UE may continue inter-frequency measurement on f2. The UE may also continue inter-frequency measurement on other frequencies using the currently stored inter-frequency NCL on frequency f3 and VASET of f3. Continue measurement has the same advantages mentioned in stage 34.

In case, the inter-frequency NCL on f2 was not maintained at stage 36 while the UE was in DC UL mode, the UE may need to rebuild a new inter-frequency NCL on frequency f2 because at this time point, there is not new MCMs from the network. If the UE maintained one NCL, either the merged or only intra-frequency NCL on frequency f2 at stage 36, the UE may copy cells from that NCL to the inter-frequency NCL on frequency f2. If the UE maintained two separate NCLs at stage 36, the UE may continue using the inter-frequency NCL on frequency f2 in the SC UL mode.

Because VASET was not maintained by the UE at stages 34 and stage 36 while the UE was in the DC UL mode, the UE may need to build a new VASET on frequency f2 because at this time point, there is not new MCMs from the network. The UE may initialize VASET according to the current specification even without receiving an MCM from the network. In another aspect, because the secondary ASET used in stage 36 contains good cells, the UE may generate a new VASET on frequency f2 by copying cells from the secondary ASET to the new VASET used on frequency f2 At the end of stage 38, the network may send MCM to reconfigure the inter-frequency measurement on f2, so the UE may simply follow this message to update its VASET and inter-frequency NCL on frequency f2.

Figure 4:
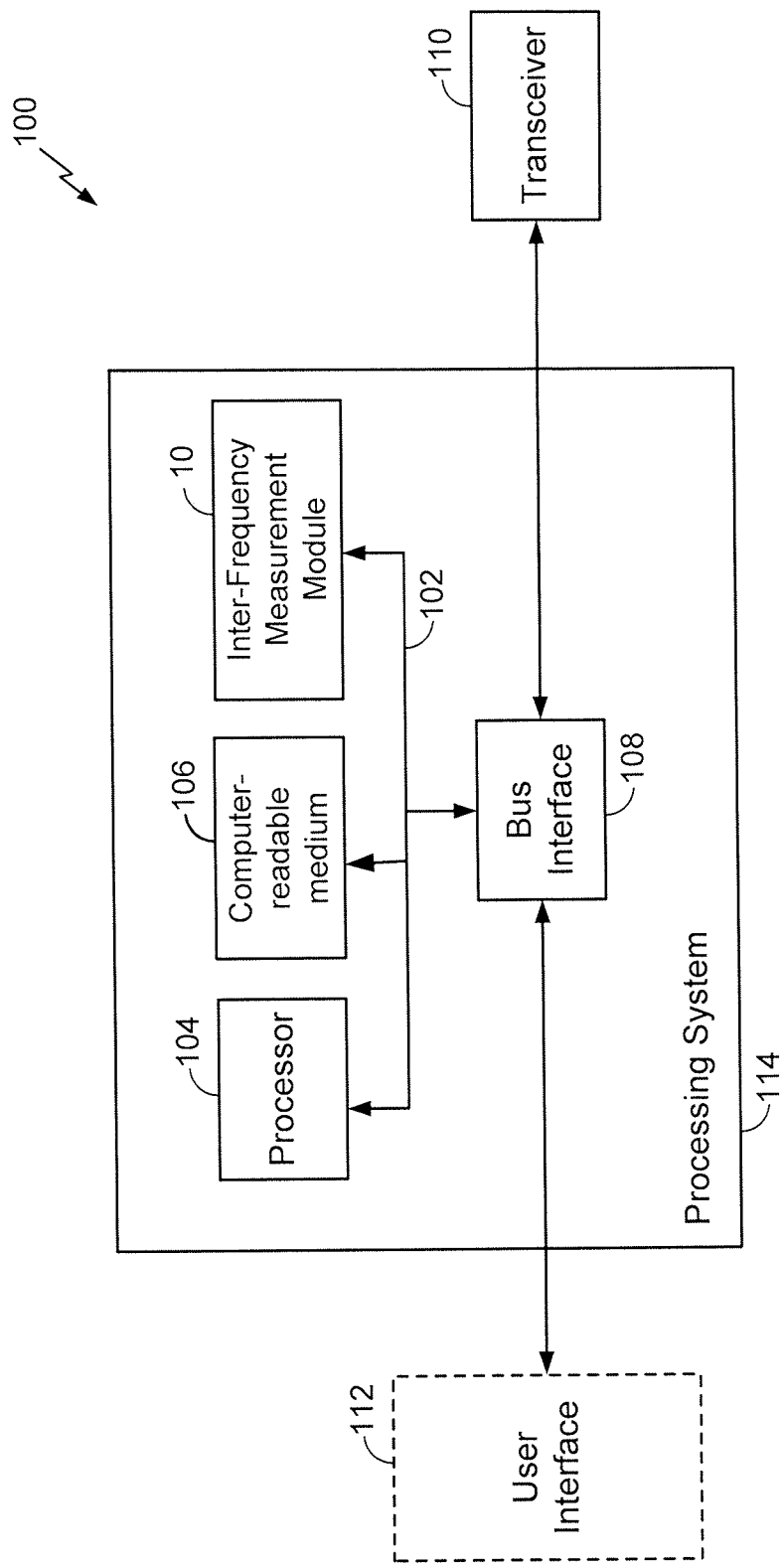
FIG. 4 is a block diagram illustrating an example of a hardware implementation for an apparatus employing a processing system according to one aspect.

FIG. 4 is a block diagram illustrating an example of a hardware implementation a processing system 114 employing UE inter-frequency measurement module, such as module 10 of FIG. 1. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 5:
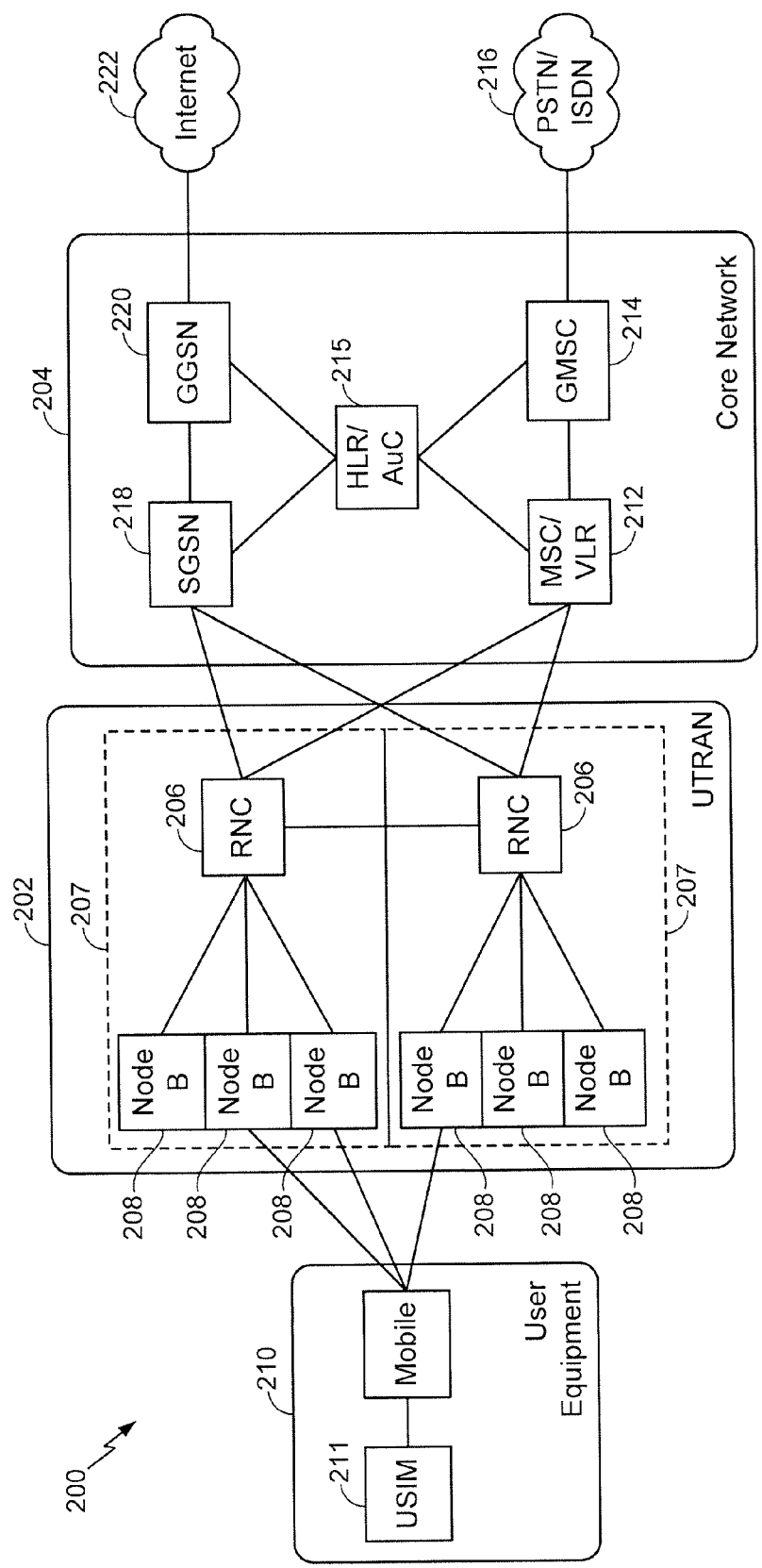
FIG. 5 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 5 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In various aspects, UE 201 may implement the inter-frequency measurement module 10 of FIG. 1. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 6:
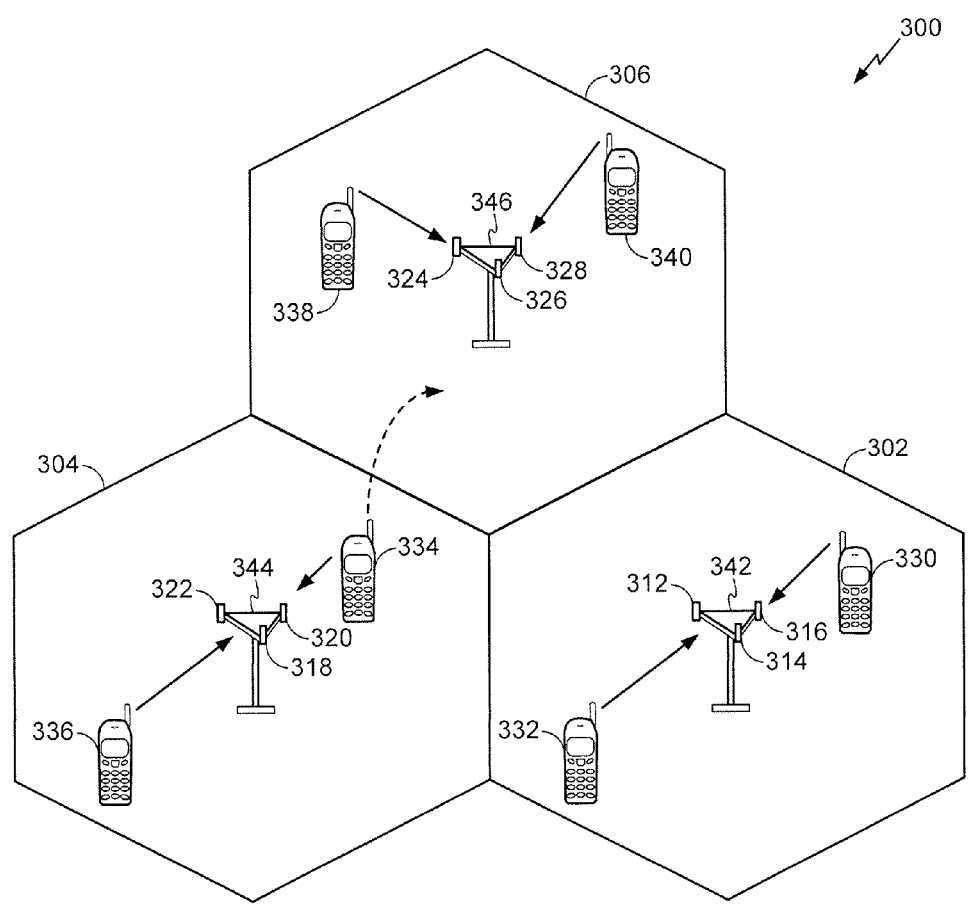
FIG. 6 is a conceptual diagram illustrating an example of an access network.

Referring to FIG. 6, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 5) for all the UEs 330, 332, 334, 336, 338, 340 in the respective cells 302, 304, and 306. In various aspects, one or more of UEs 330, 332, 334, 336, 338, 340 may implement the inter-frequency measurement module 10 of FIG. 1.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 5), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 7:
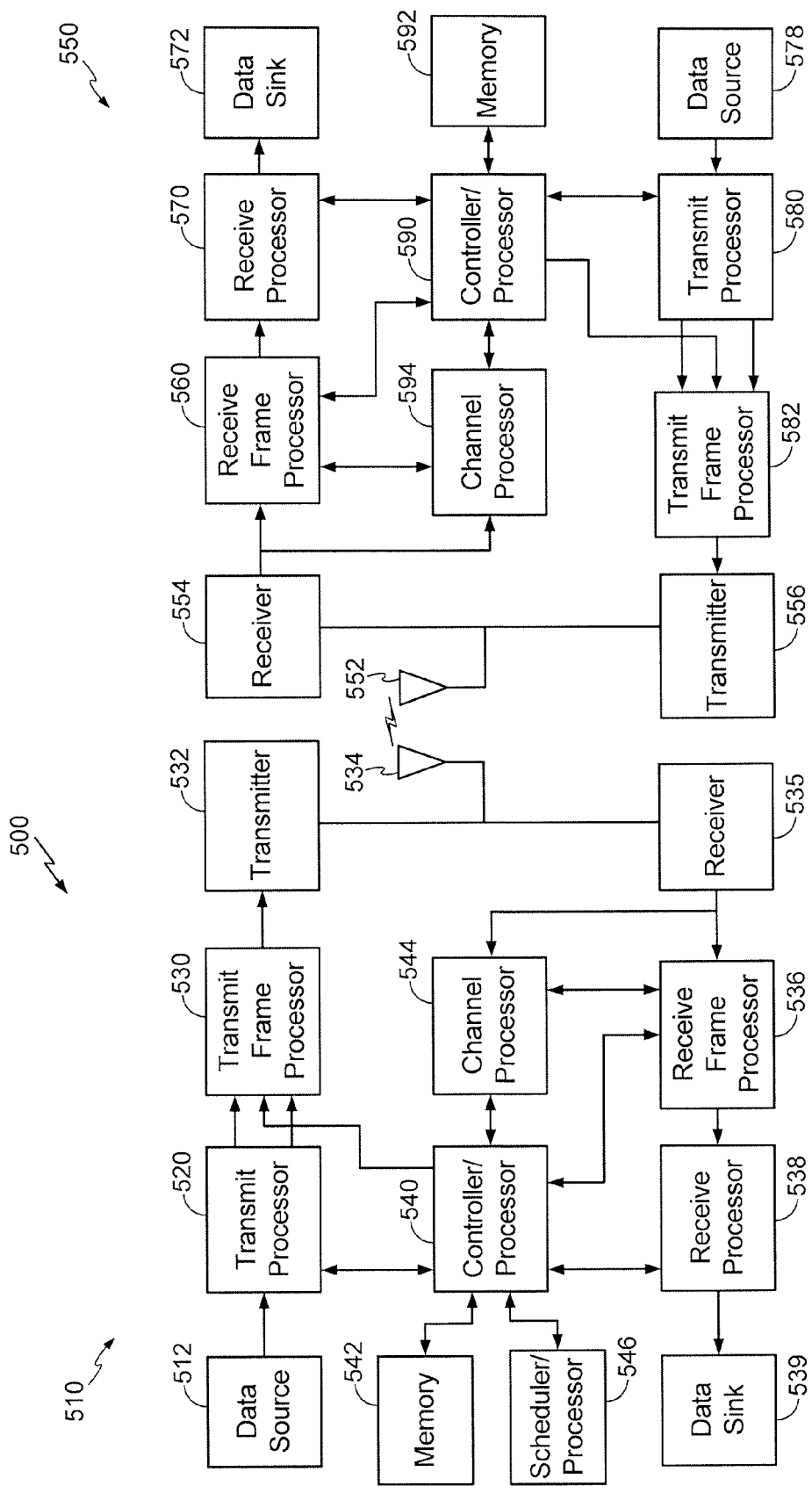
FIG. 7 is a block diagram conceptually illustrating an example of a Node B in communication with a UE in a telecommunications system.

FIG. 7 is a block diagram of a Node B 510 in communication with a UE 550, where the Node B 510 may be the Node B 208 in FIG. 5. In various aspects, one or more of UE 550 may implement the inter-frequency measurement module 10 of FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for continuous inter-frequency measurement reconfigurations in a User Equipment (UE), the method comprising:
configuring the UE to perform intra-frequency measurements on a frequency f1 and inter-frequency measurements on a frequency f2 in a dual carrier (DC) downlink (DL) mode and a single carrier (SC) uplink (UL) mode;
reconfiguring the UE to operate in a DC UL mode and continuing to perform inter-frequency measurements on the frequency f2 in the DC UL mode; and
reconfiguring the UE to operate in the SC UL mode and continuing to perform inter-frequency measurements on frequency f2 in the SC UL mode.

2. The method of claim 1, wherein configuring a UE further includes:
configuring an inter-frequency neighbor cell list (NCL) and a virtual Active Set (VASET) for performing inter-frequency measurements on the frequency f2.

3. The method of claim 2, wherein reconfiguring the UE to operate in a DC UL mode further includes:
configuring a secondary ASET for intra-frequency measurements on the frequency f2; and
continuing to perform the inter-frequency measurement on the frequency f2 using the inter-frequency NCL and the secondary ASET.

4. The method of claim 3, wherein reconfiguring the UE to operate in a DC UL mode further includes:
configuring an intra-frequency NCL for intra-frequency measurements on the frequency f2;
merging the intra-frequency NCL with the inter-frequency NCL; and
continuing to perform the inter-frequency measurements on the frequency f2 using a merged NCL and the secondary ASET.

5. The method of claim 4, wherein merging the intra-frequency NCL with the inter-frequency NCL further includes:
if the merged NCL contains more than 32 cells, removing one or more excess cells from the inter-frequency NCL and merging it with the intra-frequency NCL.

6. The method of claim 5, wherein removing one or more excess cells from the inter-frequency NCL further includes:
removing one or more excess cells having poorest signal quality.

7. The method of claim 3, wherein reconfiguring the UE to operate in a DC UL mode further includes:
maintaining separately the inter-frequency NCL and the intra-frequency NCL; and
continuing to perform the inter-frequency measurements on the frequency f2 using the inter-frequency NCL and the secondary ASET.

8. The method of claim 3, wherein reconfiguring the UE to operate in a DC UL mode further includes:
maintaining a single intra-frequency NCL; and
continuing to perform the inter-frequency measurements on the frequency f2 using the intra-frequency NCL and the secondary ASET.

9. The method of claim 2, wherein reconfiguring the UE to operate in the SC UL mode further includes:
configuring a new VASET for inter-frequency measurements on the frequency f2 in the SC UL mode; and
continuing to perform inter-frequency measurement on frequency f2 using the inter-frequency NCL and the new VASET in the SC UL mode.

10. The method of claim 9, wherein configuring a new VASET further includes:
automatically configuring by the UE a new VASET without measurement control message (MSM) from a network in the SC UL mode.

11. The method of claim 9, configuring a new VASET further includes:
copying a secondary ASET into the new VASET for inter-frequency measurements on the frequency f2 in the SC UL mode.

12. The method of claim 9, further comprising:
merging the intra-frequency NCL with the inter-frequency NCL into a new inter-frequency NCL for inter-frequency measurements on the frequency f2 in the SC UL mode.

13. The method of claim 9, further comprising:
maintaining separately the inter-frequency NCL and the intra-frequency NCL; and
continuing to perform the inter-frequency measurements on the frequency f2 using the inter-frequency NCL in the SC UL mode.

14. The method of claim 9, wherein reconfiguring the UE to operate in a DC UL mode further includes:
copying the intra-frequency NCL into a new inter-frequency NCL for inter-frequency measurements on the frequency f2 in the SC UL mode.

15. An apparatus for continuous inter-frequency measurement reconfigurations in a User Equipment (UE), comprising:
a dual carrier (DC) downlink (DL) mode configurer for configuring the UE to perform intra-frequency measurements on a frequency f1 and inter-frequency measurements on a frequency f2 in a DC DL mode;
a single carrier (SC) uplink (UL) mode configurer for configuring the UE to perform inter-frequency measurements on the frequency f2 in a SC UL mode;
a DC UL mode configure for reconfiguring the UE to operate in a DC UL mode and continue to perform inter-frequency measurements on the frequency f2 in the DC UL mode; and
wherein the SC UL mode configurer further operable to reconfigure the UE to operate in the SC UL mode following the DC UL mode and continue to perform inter-frequency measurements on frequency f2 in the SC UL mode.

16. The apparatus of claim 15, wherein configuring a UE further includes:
configuring an inter-frequency neighbor cell list (NCL) and a virtual Active Set (VASET) for performing inter-frequency measurements on the frequency f2.

17. The apparatus of claim 16, wherein reconfiguring the UE to operate in a DC UL mode further includes:
configuring a secondary ASET for intra-frequency measurements on the frequency f2; and
continuing to perform the inter-frequency measurement on the frequency f2 using the inter-frequency NCL and the secondary ASET.

18. The apparatus of claim 15, wherein reconfiguring the UE to operate in a DC UL mode further includes:
maintaining a single intra-frequency NCL; and
continuing to perform the inter-frequency measurements on the frequency f2 using the intra-frequency NCL and the secondary ASET.

19. The apparatus of claim 16, wherein reconfiguring the UE to operate in the SC UL mode further includes:
configuring a new VASET for inter-frequency measurements on the frequency f2 in the SC UL mode; and continuing to perform inter-frequency measurement on frequency f2 using the inter-frequency NCL and the new VASET in the SC UL mode.

* * * * *